United States Patent
Pi et al.

(10) Patent No.: US 8,473,290 B2
(45) Date of Patent: *Jun. 25, 2013

(54) VOICE BARGE-IN IN TELEPHONY SPEECH RECOGNITION

(75) Inventors: Xiaobo Pi, Beijing (CN); Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/197,801

(22) Filed: Aug. 25, 2008

(65) Prior Publication Data

US 2008/0310601 A1   Dec. 18, 2008

Related U.S. Application Data

(62) Division of application No. 10/204,034, filed on Mar. 25, 2003, now Pat. No. 7,437,286.

(30) Foreign Application Priority Data

Dec. 27, 2000   (WO) .................. PCT/CN00/00733

(51) Int. Cl.
*G10L 11/02*   (2006.01)
(52) U.S. Cl.
USPC ...................................... 704/233; 379/88.01
(58) Field of Classification Search
None
See application file for complete search history.

(56) References Cited

U.S. PATENT DOCUMENTS

| 4,370,521 A * | 1/1983 | Johnston et al. ............. 704/253 |
| 4,829,578 A | 5/1989 | Roberts |
| 5,495,814 A | 3/1996 | Primus |
| 5,749,067 A | 5/1998 | Barrett |
| 5,765,130 A | 6/1998 | Nguyen |
| 5,784,454 A | 7/1998 | Patrick et al. |
| 5,890,109 A * | 3/1999 | Walker et al. ................ 704/215 |

(Continued)

FOREIGN PATENT DOCUMENTS

| EP | 0736995 | 10/1996 |
| WO | WO-02/052546 | 7/2002 |

OTHER PUBLICATIONS

Non-Final Office Action for U.S. Appl. No. 10/204,034, Mailed Oct. 9, 2007, 10 pages.

(Continued)

*Primary Examiner* — Talivaldis Ivars Smits
(74) *Attorney, Agent, or Firm* — Forefront IP Lawgroup, PLLC

(57) ABSTRACT

An interactive voice response system is described that supports full duplex data transfer to enable the playing of a voice prompt to a user of telephony system while the system listens for voice barge-in from the user. The system includes a speech detection module that may utilize various criteria such as frame energy magnitude and duration thresholds to detect speech. The system also includes an automatic speech recognition engine. When the automatic speech recognition engine recognizes a segment of speech, a feature extraction module may be used to subtract a prompt echo spectrum, which corresponds to the currently playing voice prompt, from an echo-dirtied speech spectrum recorded by the system. In order to improve spectrum subtraction, an estimation of the time delay between the echo-dirtied speech and the prompt echo may also be performed.

13 Claims, 6 Drawing Sheets

U.S. PATENT DOCUMENTS

| | | | |
|---|---|---|---|
| 5,933,495 A | 8/1999 | Oh | |
| 5,956,675 A | 9/1999 | Setlur et al. | |
| 5,991,726 A | 11/1999 | Immarco et al. | |
| 5,999,901 A | 12/1999 | Knittle et al. | |
| 6,001,131 A | 12/1999 | Raman | |
| 6,061,651 A | 5/2000 | Nguyen | |
| 6,134,322 A | 10/2000 | Hoege et al. | |
| 6,266,398 B1 | 7/2001 | Nguyen | |
| 6,381,570 B2 * | 4/2002 | Li et al. | 704/233 |
| 6,496,799 B1 * | 12/2002 | Pickering | 704/235 |
| 6,574,601 B1 * | 6/2003 | Brown et al. | 704/270.1 |
| 6,651,043 B2 | 11/2003 | Ammicht et al. | |
| 6,757,384 B1 | 6/2004 | Ketchum et al. | |
| 6,757,652 B1 | 6/2004 | Lund et al. | |
| 6,922,668 B1 | 7/2005 | Downey | |
| 6,980,950 B1 | 12/2005 | Gong et al. | |
| 7,016,836 B1 | 3/2006 | Yoda | |
| 7,437,286 B2 | 10/2008 | Pi et al. | |

OTHER PUBLICATIONS

Non-Final Office Action for U.S. Appl. No. 10/204,034, Mailed Apr. 27, 2007, 11 pages.
Non-Final Office Action for U.S. Appl. No. 10/204,034, Mailed Nov. 29, 2006, 18 pages.
International Search Report for International Patent Application No. PCT/CN00/00733, Mailed Aug. 2, 2001, 2 pages.
"D/41ESC: Global SCSA 4-Port Voice Processing Board", pp. 1-8.
"Dialogic Barge-in Development Package Reference for Windows NT", (Jul. 1998), pp. 1-40.
"SCbus Routing Software Reference for Windows", (Jun. 2000), pp. 1-103.
Strom, N., et al., "Intelligent Barge-in in Conversational Systems", pp. 1-4.
Office Action received for U.S. Appl. No. 10/204,034, mailed on Apr. 9, 2008, 6 pages.

* cited by examiner

VOICE BARGE-IN IN TELEPHONY SPEECH RECOGNITION

RELATED APPLICATIONS

This application is a divisional of U.S. non-provisional application Ser. No. 10/204,034, filed Mar. 25, 2003 now U.S. Pat. No. 7,437,286.

FIELD OF THE INVENTION

The present invention relates to the field of speech recognition and, in particular, to voice barge-in for speech recognition based telephony applications.

BACKGROUND OF THE INVENTION

Speech recognition based telephony systems are used by businesses to answer phone calls with a system that engages users in natural language dialog. These systems use interactive voice response (IVR) telephony applications for a spoken language interface with a telephony system. IVR applications enable users to interrupt the system output at any time, for example, if the output is based on an erroneous understanding of a user's input or if it contains superfluous information that a user does not want to hear. Barge-in allows a user to interrupt a prompt being played using voice input. Enabling barge-in may significantly enhance the user's experience by allowing the user to interrupt the system prompt, whenever desired, in order to save time. Without barge-in, a user may react only when the system prompt completes, otherwise the user's input is ignored by the system. This may be very inconvenient to the user, particularly when the prompt is long and the user already knows the prompt message.

In today's touch tone based IVR systems, barge-in is widely adopted. However, for speech recognition based IVR systems, barge-in poses to be a much greater challenge due to background noise and echo from a prompt that may be transmitted to a voice recognition system.

One method of barge-in, referred to as key barge-in, is to stop playing a prompt and be ready to process a user's speech after the user presses a special key, such as the "#" or "*" key. One problem with such a method is that the user must be informed of how to use it. As such, another prompt may need to be added to the system, thereby undesirably increasing the amount of user interaction time with the system.

Another method of barge-in, referred to as voice barge-in, enables a user to speak directly to the system to interrupt the prompt. FIG. 1 illustrates how barge-in occurs during prompt play in a voice barge-in system. Such a method uses speech detection to detect a user's speech while the prompt is playing. Once the user' speech is detected in the incoming data, the system stops playing and immediately begins a record phase in which the incoming data is made available to a speech recognition engine. The speech recognition engine processes the user's speech.

Although, such a method may provide a better solution than key barge-in, the voice barge-in function of current IVR systems has several problems. One problem with current IVR systems is that the computer-telephone cards used in these systems may not support full-duplex data transfer. Another problem with current IVR systems is that they may not be able to detect speech robustly from background noise, non-speech sounds, irrelevant speech and/or prompt echo. For example, the prompt echo that resides in these systems may significantly degrade speech quality. Using traditional adaptive filtering methods to remove near-end prompt echo may significantly degrade the performance of automatic speech recognition engines used in these systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, numerous specific details are set forth such as examples of specific systems, components, modules, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 1:
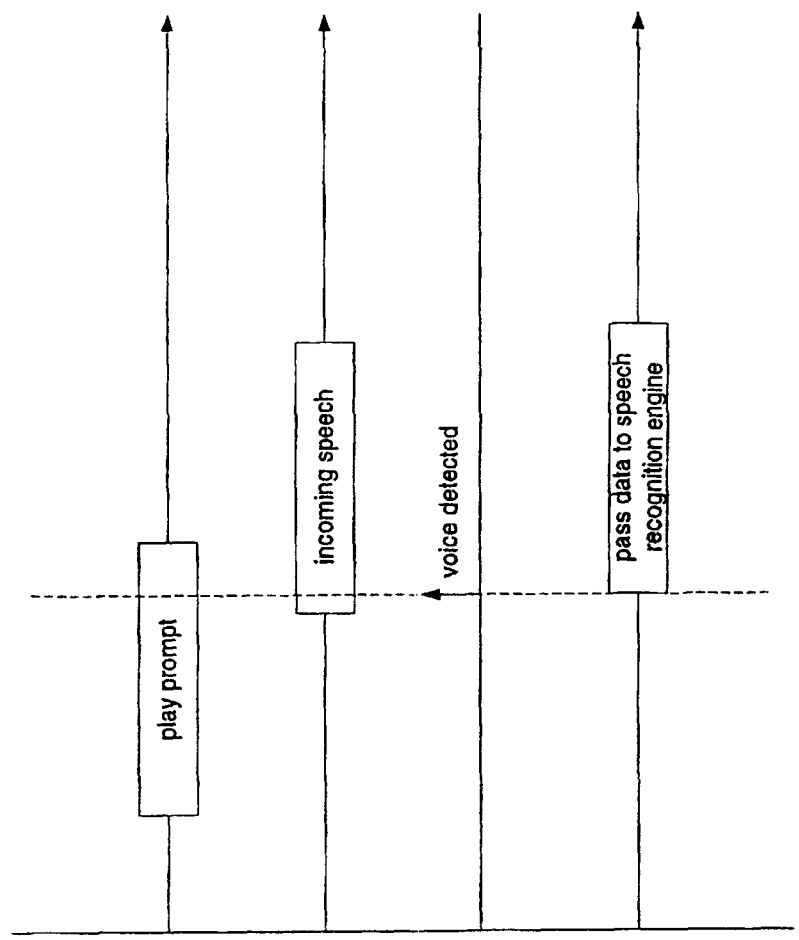
FIG. 1 illustrates barge-in during prompt play in a voice barge-in system.
Figure 2:
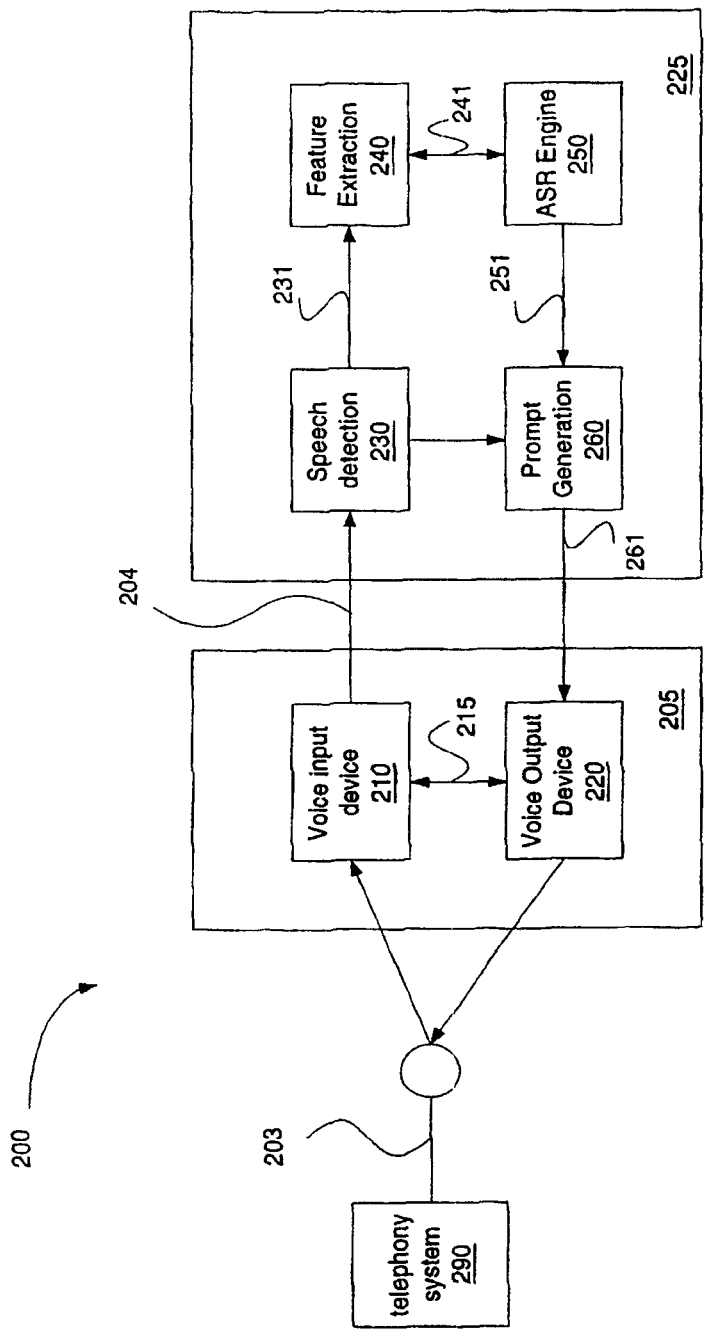
FIG. 2 illustrates one embodiment of an interactive voice response telephony system.

FIG. 2 illustrates one embodiment of an interactive voice response telephony system. IVR system 200 allows for a spoken language interface with telephony system 290. IVR system 200 supports voice barge-in by enabling a user to interrupt a prompt being played using voice input. In one embodiment, IVR system 200 includes interface module 205 and voice processing module 225. Interface module 205 provides interface circuitry for direct connection of voice processing module 225 with line 203 carrying voice data. Line 203 may be an analog or a digital line.

Interface module 205 includes voice input device 210 and voice output device 220. Voice input device 210 and voice output device 220 may be routed together using bus 215 to support full-duplex data transfer. Voice input device 210 provides for voice data transfer from telephony system 290 to voice processing module 225. Voice output device 220 provides for voice data transfer from voice processing module 225 to telephony system 290. For example, voice output device 220 may be used to play a voice prompt to a user of telephony system 290 while voice input device 210 is used to listen for barge-in (e.g., voice or key) from a user.

In one embodiment, for example, voice devices 210 and 220 may be Dialogic D41E cards, available from Dialogic Corporation of Parsippany, N.J. Dialogic's SCbus routing function may be used to establish communications between the Dialogic D41E cards. In alternative embodiment, voice devices from other manufacturers may be used, for example, cards available from Natural Microsystems of Framingham, Mass.

In one embodiment, voice processing module 225 may be implemented as a software processing module. Voice processing module 225 includes speech detection module 230, feature extraction module 240, automatic speech recognition (ASR) engine 250, and prompt generation module 260. Speech detection module 230 may be used to detect voice initiation in the data signal received from voice input device 210. Feature extraction module 240 may be used to extract features used by ASR engine 250 and remove prompt from input signal 204. A feature is a representation of a speech signal that is suitable for automatic speech recognition. For example, a feature may be Mel-Frequency Cepstrum Coefficients (MFCC) and their first and second order derivatives, as discussed below in relation to FIG. 6. As such, feature extraction may be used to obtain a speech feature from the original speech signal waveform.

ASR engine 250 provides the function of speech recognition. Input 231 to ASR engine 250 contains vectors of speech. ASR engine 250 outputs 241 a recognition result as a word string. When ASR engine 250 recognizes a segment of speech, according to a particular prompt that is playing, feature extraction module 240 cleans up the speech containing data signal. For example, feature extraction module 240 may subtract the corresponding prompt echo's spectrum from the echo-dirtied speech spectrum. In one embodiment, ASR engine may be, for example, an Intel Speech Development Toolkit (ISDT) engine available from Intel Corporation of Santa Clara, Calif. In alternative embodiment, another ASR engine may be used, for example, ViaVoice available from IBM of Armonk, N.Y. ASR engines are known in the art; accordingly, a detailed discussion is not provided.

Prompt generation module 260 generates prompts using a text-to-speech (TTS) engine that converts text input into speech output. For example, the input 251 to prompt generation module 260 may be a sentence text and the output 261 is a speech waveform of the sentence text. TTS engines are available from industry manufacturers such as Lucent of Murray Hill, N.J. and Lernout & Hauspie of Belgium. In an alternative embodiment, a custom TTS engine may be used. TTS engines are known in the art; accordingly, a detailed discussion is not provided.

After prompt waveform is generated, prompt generation module 260 plays a prompt through voice output device 220 to the user of telephony system 290. It should be noted that in an alternative embodiment, the operation of voice processing module 225 may be implemented in hardware, for example, is a digital signal processor.

Referring again to speech detection module 230, in one embodiment, two criteria may be used to determine if input signal 204 contains speech. One criteria may be based on frame energy. A frame is a segment of input signal 204. Frame energy is the signal energy within the segment. In one embodiment, if a segment of the detected input signal 204 contains speech, then it may be assumed that a certain number of frames of a running window of frames will have their energy levels above a predetermined minimum energy threshold. The window of frames may be either sequential or non-sequential. The energy threshold may be set to account for energy from non-desired speech, such as energy from prompt echo.

In one embodiment, for example, a frame may be set to be 20 milliseconds (ms), where speech is assumed to be short-time stationary up to 20 ms; the number of frames may be set to be 8 frames; and the running window may be set to be 10 frames. If, in this running window, the energy of 8 frames is over the predetermined minimum energy threshold then the current time may be considered as the start point of the speech. The energy threshold may be based on, for example, an average energy of prompt echo that is the echo of prompt currently being played. In this manner, the frame energy threshold may be set dynamically. According to different echoes of prompt, the frame energy threshold may be set as the average energy of the echo. The average energy of prompt echo may be pre-computed and stored when a prompt is added into system 200.

Another criteria that may be used to determine if input signal 204 contains speech is the duration of input signal 204. If the duration of input signal 204 is greater than a predetermined value then it may be assumed that input signal 204 contains speech. For example, in one embodiment, it is assumed that any speech event lasts at least 300 ms. As such, the duration value may be set to be 300 ms.

After a possible start point of speech is detected, speech detection module 230 attempts to detect the end point of the speech using the same method as detecting the start point. The start point and the end point of speech are used to calculate the duration. Continuing the example, if the speech duration is over 300 ms then the possible start point of speech is a real speech start point and the current speech frames and successive speech frames may be sent to feature extraction module 240. Otherwise, the possible start point of speech is not a real start point of speech and speech detection is reset. This procedure lasts until an end point of speech is detected or input signal 204 is over a maximum possible length.

Speech detection module 230 may also be used to estimate the time delay of the prompt echo in input signal 204 if an echo cancellation function of system 200 is desired. While a prompt is added in system 200, its waveform may be generated by prompt generation module 260. The waveform of the prompt is played once so that its echo is recorded and stored. When processing an input signal, correlation coefficients between input signal 204 and the stored prompt echo is calculated with the following equation:

$$C(\tau) = \sum_{t=1}^{T} S(t+\tau) \times E(t)$$

where C is the correlation coefficients; S is input signal 204, E is the prompt echo, T is the echo length, and $\tau$ is the time delay estimation of echo. The value of $\tau$ may range from zero to the maximum delay time (e.g., 200 ms). After C is computed, the maximum value of C in all τ is found. This value of τ is the time-delay estimation of echo. This value is used in the feature extraction module 240 when performing spectrum subtraction of the prompt echo spectrum to remove prompt echo from the input signal 204 having echo dirtied speech, as discussed below.

Figure 3:
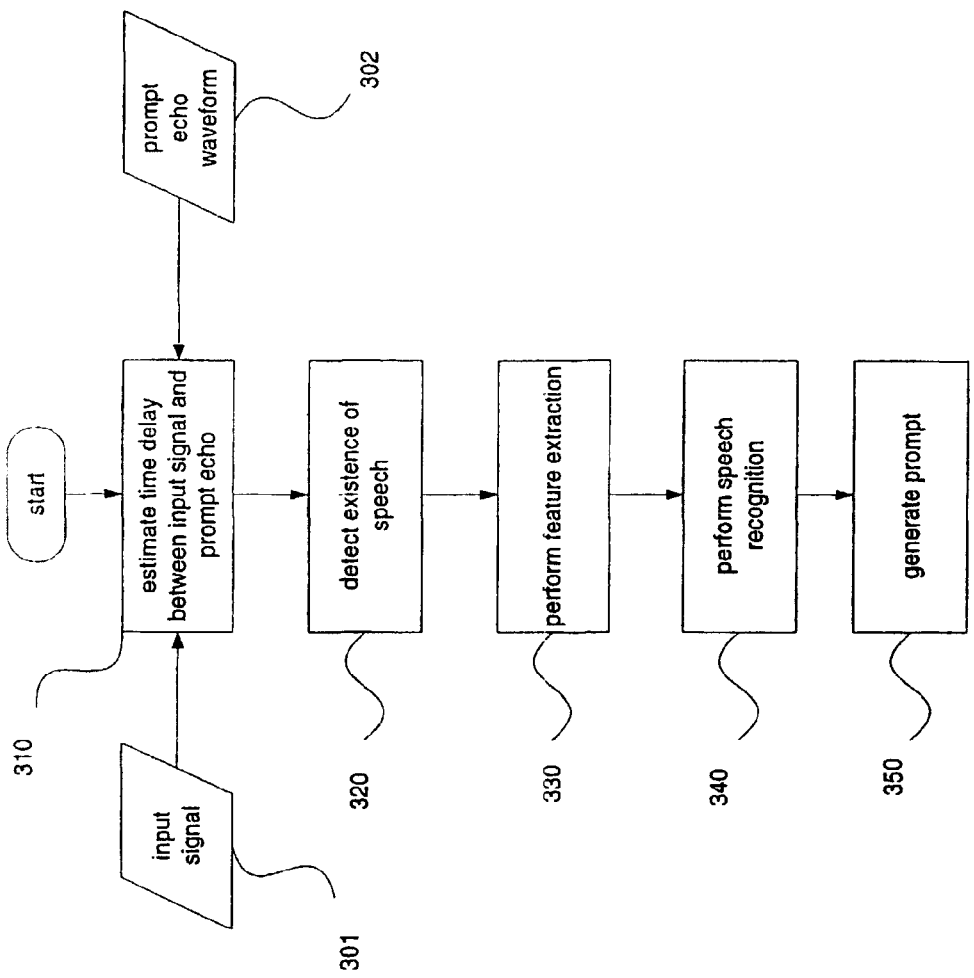
FIG. 3 illustrates one embodiment of a method of implementing an interactive voice response system.

FIG. 3 illustrates one embodiment of a method of implementing an interactive voice response system. A prompt echo waveform 302 and an input signal 301 are received by the system. In one embodiment, a speech detection module may estimate the time delay time of a feature in input signal 301, step 310. The speech detection module may also be used to detect the existence of speech in input signal 302, in step 320. The existence of speech may be based on various criteria, such as amount of frame energy of the input signal and the duration of frame energy, as discussed below in relation to FIG. 4.

In step 330, feature extraction may be used to obtain a speech feature from the original speech signal waveform. In one embodiment, prompt echo may be removed from input signal 301, using spectrum subtraction, to facilitate the recognition of speech in the input signal. After feature extraction is performed, speech recognition may be performed on input signal 301, step 340. A prompt may then be generated, step 350, based on the recognized speech.

Figure 4:
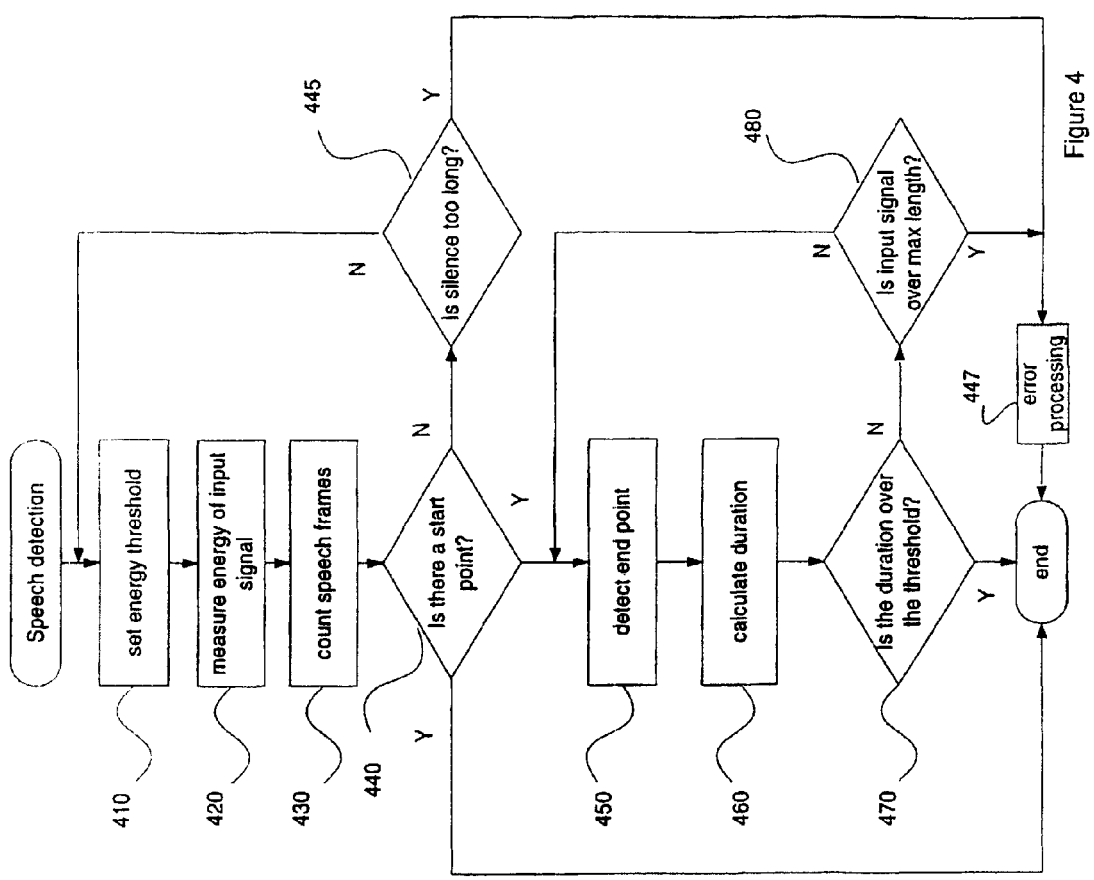
FIG. 4 illustrates one embodiment of speech detection in an input signal.

FIG. 4 illustrates one embodiment of speech detection in an input signal. In one embodiment, the frame energy of an input signal may be used to determine if the input signal contains speech. An assumption may be made that if the energy of the input signal, over a certain period of time, is above a certain threshold level, then the signal may contain speech.

Thus, in one embodiment, an energy threshold for the input signal may be set, step 410. The energy threshold is set higher than the prompt echo energy so that the system will not consider the energy of prompt echo in the input signal to be speech. In one embodiment, the energy threshold may be based on an average energy of the prompt echo that is the echo of the prompt currently playing during the speech detection. The energy of the input signal is measured over a predetermined time period, step 420, and compared against the energy threshold.

The input signal may be measured over time segments, or frames. In one embodiment, for example, a frame length of an input signal may be 20 milliseconds in duration where speech is assumed to be a short-time stationary event up to 20 milliseconds. In step 430, the number of energy frames containing energy above the threshold is counted. If the energy of the input signal over a predetermined number of frames (e.g., 8 frames) is greater than the predetermined energy threshold, then the input signal may be considered to contain speech with that point of time as the start of speech, step 440.

In one embodiment, the energy of the input signal may be monitored over a running window of time. If in this running window (e.g., 10 frames) there is the predetermined number of frames (e.g., 8 frames) over the predetermined energy threshold, then that point of time may be considered as the start of speech.

In an alternative embodiment, another method of detecting the start of speech may be used. For example, the rate of input signal energy crossing over the predetermined threshold may be calculated. If the measure rate exceeds a predetermine rate, such as a zero-cross threshold rate, then the existence and start time of speech in the input signal may be determined.

If no speech is detected in the input signal, then a determination may be made whether the period of silence (i.e., non-speech) is too long, step 445. If a predetermined silence period is not exceeded, then the system continues to monitor the input signal for speech. If the predetermined silence period is exceeded, then the system may end its listening and take other actions, for example, error processing (e.g., close the current call), step 447.

In one embodiment, the duration of frame energy of an input signal may also be used to determine if the input signal contains speech. A possible start point of speech is detected as described above in relation to steps 410 through 440. After a possible start point of speech is detected, then the end point of the speech is detected to determine the duration of speech, step 450. In one embodiment, the end point of speech may be determined in a manner similar to that of detecting the possible start point of speech. For example, the energy of the input signal may be measured over another predetermined time period and compared against the energy threshold. If the energy over the predetermined time period is less than the energy threshold then the speech in the input signal may be considered to have ended. In one embodiment, the predetermined time in the speech end point determination may be the same as the predetermined time in the speech start point determination. In an alternative embodiment, the predetermined time in the speech end point determination may be different than the predetermined time in the speech start point determination.

Once the end point of speech is determined, the duration of the speech is calculated, step 460. If the duration is above a predetermined duration threshold, then the possible start point of speech is a real speech start point step 470. In one embodiment, for example, the predetermined duration threshold may be set to 300 ms where it is assumed that any anticipated speech event lasts for at least 300 ms.

Otherwise, the possible start point of speech is not a real start point of speech and the speech detection may be reset. This procedure lasts until an end point of speech is detected or the input signal is over a maximum possible length, step 480.

Figure 5:
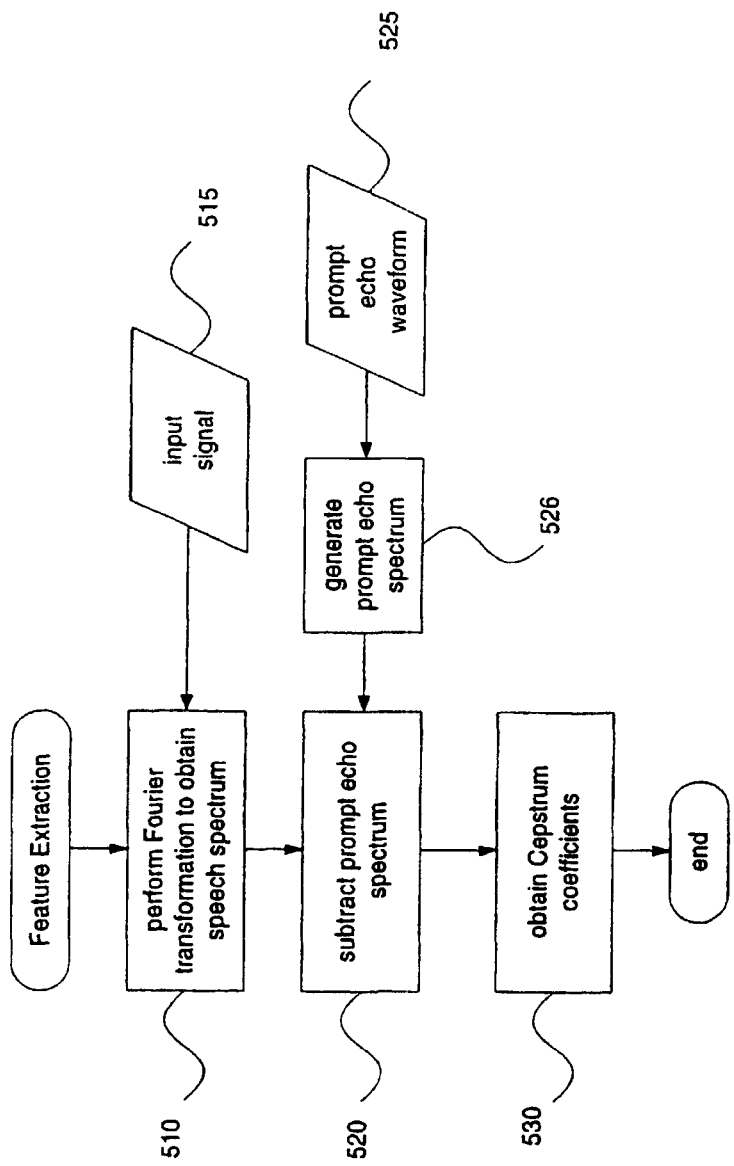
FIG. 5 illustrates one embodiment of a feature extraction method.

FIG. 5 illustrates one embodiment of a feature extraction method. In one embodiment, an input signal and a prompt echo waveform are received, steps 515 and 525, respectively. A Fourier transformation is performed to obtain a speech spectrum from the input signal, step 510. A Fourier transformation may also be performed on the echo waveform to generate a prompt echo spectrum, step 526.

In one embodiment, the prompt echo spectrum is shifted according to a time delay estimated between the input signal and the prompt echo waveform, step 519. The prompt echo spectrum is computed and subtracted from the speech spectrum, step 520. Afterwards, the Cepstrum coefficients may be obtained for use by ASR engine 250 of FIG. 2 in performing speech recognition, step 530.

In one embodiment, feature extraction involves the cancellation of echo prompt from the input signal, as discussed below in relation to FIG. 6. When ASR engine 250 of FIG. 2 recognizes a segment of speech, feature extraction may be used to subtract a prompt echo spectrum that corresponds to the currently playing prompt from echo-dirtied speech spectrum. In order to improve spectrum subtraction, an estimation of the time delay between the echo-dirtied speech and the recorded echo may be performed by speech detection module 230 of FIG. 2.

Figure 6:
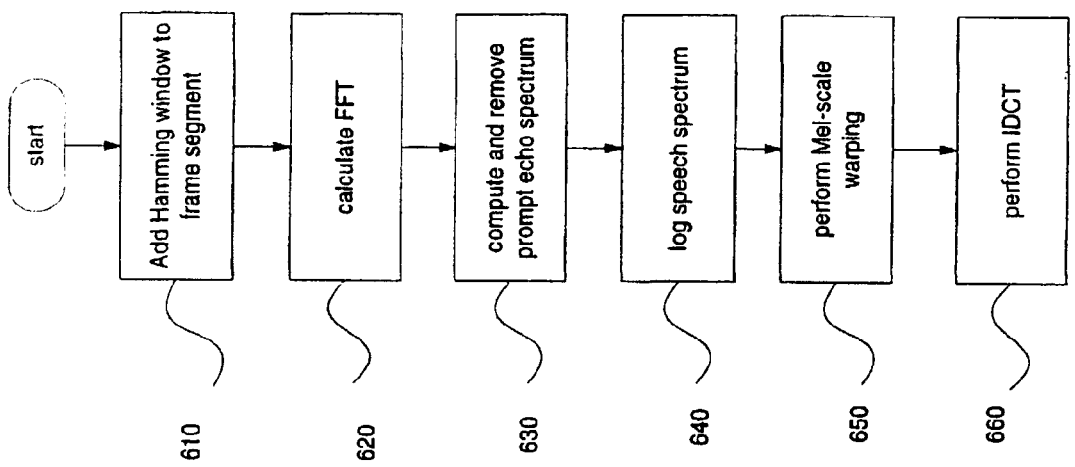
FIG. 6 illustrates an embodiment of a feature extraction method for a particular feature.

FIG. 6 illustrates an embodiment of a feature extraction method for a particular feature. In one embodiment, Mel-Frequency Cepstrum Coefficients (MFCC) may be used to in performing speech recognition. Using a MFCC generation procedure, a Hamming window is added to the frame segment set for speech (e.g., 20 ms), step 610. A Fast Fourier Transform (FFT) is calculated to obtain the speech spectrum, step 620. If the echo spectrum subtraction function is enabled, shift the echo waveform according to the time delay then compute the echo spectrum and subtract the echo spectrum from the input signal spectrum, step 630. Next perform a logarithmic operation on the speech spectrum, step 640. Perform Mel-scale warping to reflect the non-linear perceptual characteristics of human hearing, step 650. Perform Inverse Discrete Time Transformation (IDCT) to obtain the Cepstrum coefficients, step 660. The resulting feature is a multiple (e.g., 12 dimension) vector. These parameters form the base feature of MFCC.

In one embodiment, the first and second derivatives of the base feature are added to be the additional dimensions (the $13^{th}$ to $24^{th}$ and $25^{th}$ to $36^{th}$ dimensions, respectively), to account for a change of speech over time. By using near-end prompt echo cancellation, the performance of the ASR engine 250 of FIG. 2 may be improved. In one embodiment, for example, the performance of the ASR engine 250 of FIG. 2 may improve by greater than 6%.

In the foregoing specification, the invention has been described with reference to specific exemplary embodiments thereof. It will, however, be evident that various modifications and changes may be made thereto without departing from the broader spirit and scope of the invention as set forth in the following claims. The specification and drawings are, accordingly, to be regarded in an illustrative sense rather than a restrictive sense.

What is claimed is:

1. An apparatus, comprising:
   a voice interface device comprising:
      a voice input device; and
      a voice output device coupled with the voice input device to support full duplex data transfer between the voice interface device and a telephony system; and
   a voice processing module coupled with the voice interface device to detect speech, wherein the voice processing module to detect speech is to detect a start point of possible speech by comparing an energy of an input signal from the voice input device and a frame energy threshold over a time period, and wherein the frame energy threshold is dynamically set based on an average energy of a prompt echo that is currently played.

2. The apparatus of claim 1, wherein the voice output device to support the full-duplex data transfer is to play a voice prompt in response to a detection of speech by the voice processing module.

3. The apparatus of claim 2, wherein the time period is a first time period, and wherein the speech detection module to detect speech is further to:
   detect an end point of possible speech by comparing the energy of the input signal and the frame energy threshold over a second time period; and
   detect speech in response to a determination that the duration between the start point and the end point of possible speech exceeds a duration threshold.

4. The apparatus of claim 3, wherein the processing software further comprises:
   a feature extraction module to remove the prompt echo from the input signal using spectrum subtraction after speech is detected.

5. The apparatus of claim 4, wherein the feature extraction module to remove the prompt echo is to extract a feature from the input signal to generate a plurality of coefficients, wherein the feature is a representation of the speech signal suitable for automatic speech recognition.

6. The apparatus of claim 5, wherein the processing software further comprises:
   an automatic speech recognition engine to perform speech recognition on the input signal using the plurality of coefficients.

7. The apparatus of claim 5, wherein the processing software further comprises:
   a prompt generation module to generate a prompt in response to particular speech recognized in the input signal.

8. The apparatus of claim 4, wherein the feature extraction module to remove the prompt echo from the input signal using spectrum subtraction is to:
   estimate a time delay between the input signal and the prompt echo; and
   remove the prompt echo from the input signal based on the time delay.

9. The apparatus of claim 8, wherein the feature extraction module to remove the prompt echo from the input signal using spectrum subtraction is further to:
   generate a prompt echo spectrum;
   calculate a Fast Fourier Transform using the input signal to obtain a speech spectrum; and
   subtract the prompt echo spectrum from the speech spectrum using the estimated time delay.

10. The apparatus of claim 9, wherein the feature extraction module to remove the prompt echo from the input signal using spectrum subtraction is further to:
    perform a logarithm on the speech spectrum, wherein the speech spectrum has the prompt echo spectrum subtracted from it; and
    perform Mel-scale warping on the logarithm of the speech spectrum.

11. The apparatus of claim 3, wherein the duration threshold comprises a predetermined duration threshold.

12. The apparatus of claim 3, wherein the speech detection module to detect the start point of possible speech is to:
    measure the energy of the input signal for each of a plurality of segments of the first time period; and
    determine whether the energy of the input signal for the first time period is greater than the frame energy threshold for a number of the plurality of segments.

13. The apparatus of claim 1, wherein the voice processing module comprises a digital signal processor.

* * * * *